United States Patent [19] [11] 3,712,777
Sherer [45] Jan. 23, 1973

[54] APPARATUS FOR REMELTING SPRUE MATERIAL

[75] Inventor: Kenneth E. Sherer, Richmond, Ind.

[73] Assignee: National Automatic Tool Company, Incorporated, Ind.

[22] Filed: June 1, 1971

[21] Appl. No.: 148,630

[52] U.S. Cl. ................................. 425/217, 264/329
[51] Int. Cl. ..................... B29c 29/00, B29h 19/00
[58] Field of Search ...... 425/197, 215, 216, 217, 219, 425/242; 264/329

[56] References Cited

UNITED STATES PATENTS

| 2,698,460 | 1/1955 | Amo | 264/329 X |
| 2,698,464 | 1/1955 | Wilson | 264/329 X |
| 2,895,167 | 7/1959 | Paggi | 425/197 |
| 3,112,523 | 12/1963 | Goulet et al. | 425/216 |
| 3,118,184 | 1/1964 | Swenson | 264/329 UX |

FOREIGN PATENTS OR APPLICATIONS 1,190,646 | 4/1965 | Germany | 425/217

Primary Examiner—J. Spencer Overholser
Assistant Examiner—Michael O. Sutton
Attorney—Molinare, Allegretti, Newitt & Witcoff

[57] ABSTRACT

A method and apparatus for remelting plastic sprue material remaining adjacent a mold in an injection molding machine after an injection molding cycle of operation. Pressure is applied in a conventional manner to heated plastic for passage through a heated nozzle member in an injection molding machine. The nozzle contains a shuttle member which is moved to an injection position as the melted heated plastic is passed through the nozzle and the shuttle member, through a sprue line and then to the mold cavity. After the plastic solidifies in the mold cavity, a sprue removal pin is passed through the sprue line so as to remove the waste material or sprue material from the sprue line. This movement of the sprue removal pin moves the sprue back towards the nozzle and the sprue moves the shuttle member to a retraction position. The sprue then passes through a second path of travel which is past the heated portion of the nozzle for reheating and remelting the sprue material for later use thereof in an injection molding cycle.

10 Claims, 2 Drawing Figures

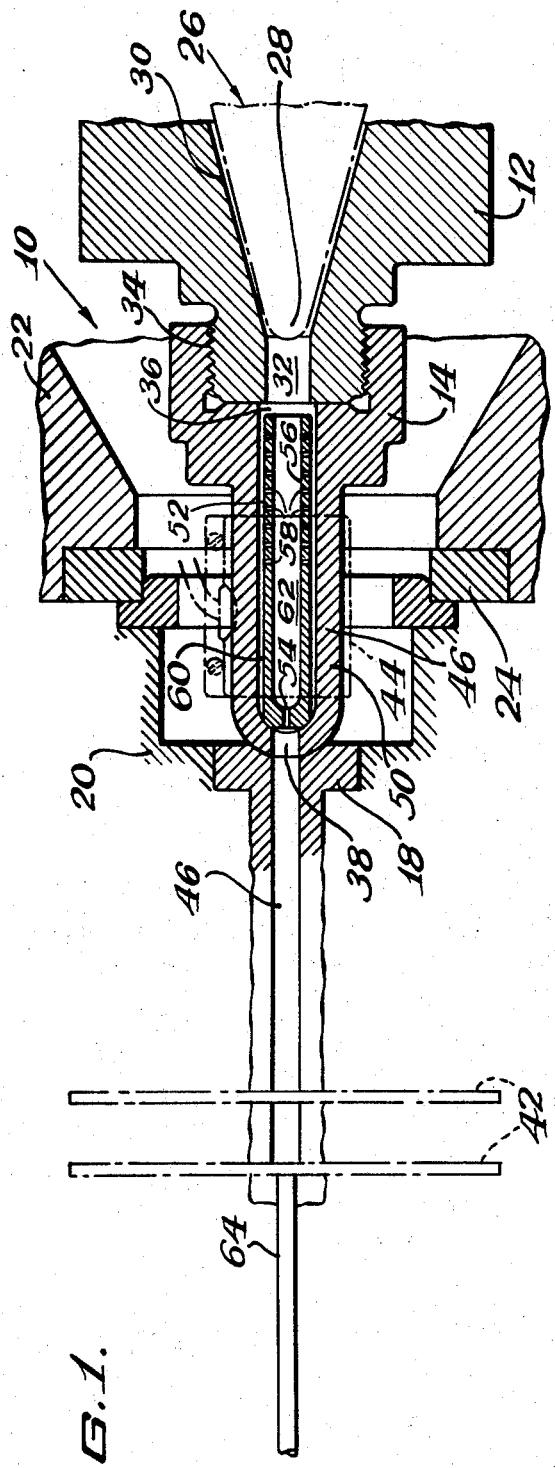
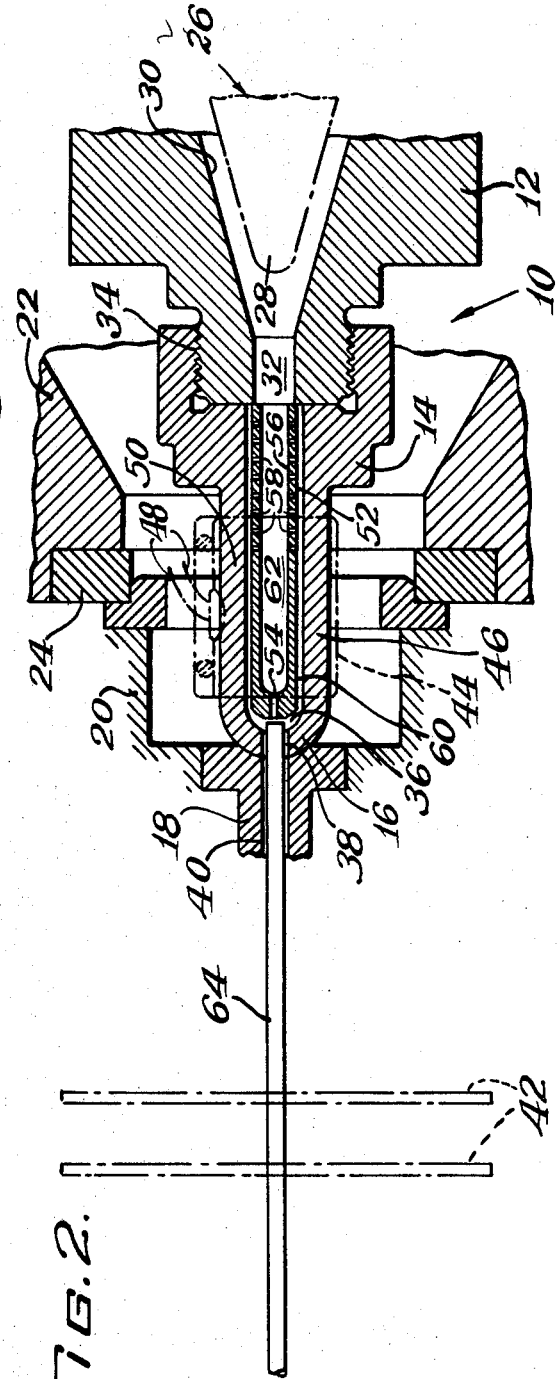

APPARATUS FOR REMELTING SPRUE MATERIAL

BACKGROUND OF THE INVENTION — FIELD OF THE INVENTION AND, DESCRIPTION OF THE PRIOR ART

This invention relates to a method and apparatus for remelting plastic sprue material which is formed following an injection molding operation in an injection molding machine.

In injection molding operations, melted plastic is forced under pressure into a mold. The plastic is solidified in the mold and the molded part is removed. It is conventional in injection molding operations for the pressurized melted plastic to pass under pressure from the injection nozzle through a conduit or a sprue line before the fluid plastic is introduced into the mold. Since the pressurized plastic itself forces the plastic into the mold, plastic waste or sprue material forms in the sprue line. In some operations, the sprue solidifies on the part itself and must be removed from the part in a later operation before the part is placed into condition for use. Alternatively, at least part of the sprue material may be removed from the mold area so that the sprue material will be substantially separated from the part which is being made. In this alternative arrangement, at least in some molding operations, it is considered desireable to use this at least partially solidified sprue material in a subsequent molding cycle. Since the sprue is at least partially solidified, it is necessary to reheat and remelt the sprue material for later use.

As a specific example where reuse of sprue material is considered desireable, 45 rpm records are conventionally molded two at a time in a sandwich type mold. Molding of these records is automated to a high degree and it is considered highly desireable for the plastic sprue material that is used for feeding the plastic to the mold cavities to be remelted for use rather than being later removed and then reused or discarded. This sprue material is to be handled properly for immediate reuse so that during the next injection molding shot, the cold plastic material will not be forced into the mold cavities, which would result in poor records.

SUMMARY OF THE INVENTION

It is therefore an important object of this invention to provide an injection molding machine which includes means for conveniently remelting sprue material following an injection molding operation so that the sprue may be used as material to be injected into the mold cavities.

It is also an object of this invention to provide a method and apparatus for injecting plastic material into mold cavities and thereafter removing material from the sprue line for remelting in a heated nozzle so that the remelted sprue material may be used in subsequent injection molding operation.

It is a further object of this invention to provide an injection molding machine which includes a nozzle member having a shuttle member contained therein, the shuttle member defining a first path of travel in a first position for pressurized melted plastic during injection of plastic into the mold cavities and defining a second path of travel in a second position for passing the sprue material adjacent the heated nozzle for remelting of the sprue material for subsequent use.

It is a further object of this invention to provide an improved apparatus and method for conveniently, simply, and economically, reheating and remelting sprue material during an injection molding machine cycle of operations whereby the sprue material may be used in a later injection cycle.

It is yet another object of this invention to provide an injection molding machine which includes a sprue removal device which is in cooperative relationship with a shuttle member contained within a heated nozzle member for forcing the sprue material to a position adjacent the heated zone of the nozzle so that the sprue material may be reheated and melted for use.

Further purposes and objects of this invention will appear as the specification proceeds.

The foregoing objects are accomplished by my method and device for remelting sprue material, wherein an injection molding machine includes a heated member which has an outlet thereon for passage of melted plastic therethrough, a mold, means interconnecting the outlet and the mold, a reciprocal shuttle member which is carried within the heated member and is selectively moveable to a first position defining a first path of travel and to a second position defining a second path of travel, means for injecting pressurized melted plastic into the heated nozzle member through the first path of travel, through the outlet, through the interconnecting means, and into the mold, and a sprue clearing pin, operative after introduction of the plastic into the mold, for removing the sprue material from the interconnecting means and from the outlet and for moving the sprue material through the second path of travel, the sprue being remelted during movement through the second path of travel upon moving past the heated nozzle member.

BRIEF DESCRIPTION OF THE DRAWINGS

A particular embodiment of the present invention is illustrated in the accompanying drawings; wherein:

FIG. 1 is a schematic, longitudinal cross-sectional view through an injection molding machine embodying my sprue remelting apparatus, the apparatus being shown during the injection phase of operation; and FIG. 2 is a schematic view, like FIG. 1, except the apparatus is shown during the retraction phase of operations when the sprue material is being remelted.

DETAILED DESCRIPTION OF THE PREFERRED EMBODIMENT

The accompanying drawings illustrate, generally in schematic form, a portion of an injection molding machine, generally 10. The injection molding machine 10, includes an end cap 12 having a nozzle member 14 mounted thereon. The outer end or tip 16 of the nozzle 14 is movable into sealing engagement with a sprue bushing 18 for the injection of pressurized plastic therein. The sprue bushing 18 is carried within the mold part 20. The mold part 20 is mounted on a die head 22 which also has a locating ring 24 mounted thereon.

The end cap 12 carries injection screw 26 which rotates and reciprocates. The injection screw 26 includes a tapered outer end or tip 28, which is movable between the retraction or starting position, shown in FIG. 2, and the injection position, shown in FIG. 1. The screw tip 28 is located within the cavity 30 of the end cap 12, the screw tip 28 being tapered at substantially the same conical shape as the interior surface of the cavity 30 in the end cap 12. The cavity 30 terminates with a cylindrical outlet 32 through which pressurized and melted plastic is passed during the plastic injection operation.

The nozzle member 14 is hollow and is sealably mounted by threaded interconnection 34, to the outer end of the end cap 12. The nozzle member 14 projects outwardly from the end cap 12 and includes an outer end or tip 16 with a hollow central portion 36 which directly aligns with the outlet 32 of the end cap 12. The hollow central portion 36 is substantially coaxial with the outlet 32 and with a discharge opening 38 defined in the outer tip 16 of the nozzle 14.

During injection molding, the pressurized plastic passes outwardly through the discharge opening 38 after the nozzle tip 16 is moved into sealing engagement with the sprue bushing 18, as previously described. The sprue bushing 18 includes a sprue line or conduit 40 which is substantially straight and coaxial with the nozzle 14. The sprue line 40 leads to one or more cavities 42 in which the plastic molded parts are formed. In the specific embodiment shown, sandwich type mold cavities for forming 45 rpm records are illustrated. It is to be understood, however, that any suitable type of mold cavities may be used in conjunction with this invention.

Referring to FIG. 1, in the injection position, after the mold cavities are filled with plastic and solidified, therein, plastic material also solidifies in the sprue line 40. Although this material is often considered waste material, this sprue material, in my invention, is remelted and used in a later injection cycle.

In order to accomplish remelting of the sprue material, a heating band or element 44 is positioned around the reduced forward portion 46 of the nozzle member 14. Suitable electrical leads 48 are connected to an electrical wire for heating band 44 to the desired temperature level. The heating band 44 thereby raises the temperature of walls 50 defining the forward portion 46 to a desired temperature for remelting the sprue material for use in a subsequent injection molding cycle of operation.

In order to accomplish the desired injection of plastic into the mold cavities 20 during the injection phase of the operation, and to accomplish remelting and reheating of the sprue material during the retraction phase, it is important to provide a shuttle member 52 within the hollow central portion 36 of the nozzle member 14. The shuttle member 52 is a substantially hollow member which is coaxially mounted with the hollow central portion of the nozzle 14, which in turn is coaxial with the discharge opening 38 and with the outlet 32 on the end cap 12. The inner end of the shuttle member 52 has a relatively large opening and is movable into direct communication with the outlet 32 in the end cap 12. The opposite end of the shuttle member 52 includes an orifice 54 of reduced diameter. More specifically, the orifice 54 is of such a size as to permit passage of melted plastic material therethrough in the injection phase of operation but to prevent passage of the sprue material therethrough in an opposite direction. It has been found that an orifice size of about 0.060 inches provides advantageous results.

At the rearward portion 56 of the shuttle member 52, a plurality of uniformly spaced apertures 58 are provided. The outer configuration of the shuttle member 52 is significantly less than the interior diameter of the hollow portion 36 of the nozzle member 14 so as to define a substantially annular channel 60 therebetween. In order to provide this annular spacing, a suitable number of spacing ribs (not shown) are provided either on the outer surface of the shuttle member 52 or on the inner surface of the wall 50 of the hollow central portion 36 of the nozzle member 14. The apertures 58 provide for intercommunication between the annular chamber 60 and the hollow interior 62 of the shuttle member 52. The shuttle member 52 is reciprocally movable between the injection position shown in FIG. 1 and the retraction position shown in FIG. 2, which operation will be described hereinafter in greater detail.

In order to remove the sprue material from the sprue line 40, a reciprocal sprue removal pin 64 is provided. The pin 64 is movable between a first position, downstream of the outermost cavity 42 and a position which extends through the discharge opening 38 of the nozzle member 14, following removal of substantially all of the sprue material from the sprue line 40 and from the discharge opening 38 in the nozzle 14.

My improved method for reheating, remelting and reusing the sprue material will be understood by a description of operation of the apparatus described above.

Referring to FIG. 2, the screw tip 28 is shown in its retracted position and a measured amount of melted plastic is stored in front of the screw tip following screw rotation. At this time, the screw tip 28 is spaced from the tapered cavity 30 and the end cap 12. When the molds are closed by suitable means (not shown), and clamped together by suitable means (not shown), the injection screw 26 moves forward inside the end cap 12 and forces the melted plastic under pressure, through the end cap outlet 32 and into the nozzle member 14.

The pressure of the melted plastic acting against the shuttle member 52 drives the shuttle member 52 from the retracted position shown in FIG. 2 to the injection position shown in FIG. 1. The outer end of the shuttle member 52 defines an annular sealing engagement together with the inner spherical section of the outer end of the hollow central portion 36 of the nozzle 14 so as to prevent passage of the melted plastic material from the annular chamber 60, between the shuttle member 52 and the nozzle member walls 50, directly to the nozzle discharge opening 38. With this sealing arrangement, the pressurized melted plastic passes through the first or injection path of travel in the hollow interior 62 and through the orifice 54 of the shuttle member 52, and outwardly through the discharge opening 38 in the nozzle member 14. Pressurized plastic continues through its path of travel down the sprue line 40 and into the mold cavities 42. When a sufficient amount of plastic has been charged into the mold cavities 42 and the plastic has solidified in the mold cavities 42, solidified sprue material is formed in the sprue line 40.

At this time, the sprue removal pin 64 is moved directly against the sprue material in the sprue line 40. This returns the pliable solidified sprue material towards and into the nozzle member 14. When the sprue material contacts the outer end of the shuttle member 52, the shuttle member 52 is forcibly moved away from sealing engagement with the hollow interior of the nozzle member 14. The shuttle member 52 is moved in this manner until the annular inner end of the shuttle member 52 strikes or engages the outer end of the end cap 12, which thereby acts as a stroke limiting member.

As the sprue is pushed against the shuttle member 52, the plastic sprue moves around the shuttle member 52, as it cannot pass through the orifice 54, and into the annular chamber 60. In the chamber 60, the sprue material is in intimate contact with the heated walls 50 of the nozzle member 14. This results in rapid melting of the sprue material which is then passed into the hollow shuttle 52 through the uniformally spaced apertures at the rear portion 56 of the shuttle 52. Sprue removal may be facilitated by retraction of the screw tip 28 at a controlled rate before the sprue removal pin 64 is forced against the sprue material, whereby the pressure inside the hollow shuttle member is substantially reduced. The sprue removal pin 64 is used until substantially all the sprue material has been melted.

When the sprue removal pin is in the position shown in FIG. 2, the screw 26 may be rotated to assure adequate melting of the thermoplastic material for the next shot or injection molding operation. When a measured volume of plastic material is again prepared, and rotation of the screw has been stopped, the sprue removal pin 64 is retracted from the position of FIG. 2 to that of FIG. 1. The mold halves (not shown) are then opened and the mold parts are removed from the mold cavities 30.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. In a plastic injection molding machine, a heated member having an outlet thereon for passage of melted plastic therethrough, mold means, means interconnecting said outlet and said mold means, a reciprocal member carried within said heated member and being selectively movable therein to a first position for defining a first path of travel and to a second position for defining a second path of travel, means for injecting pressurized liquid plastic into the heated member, said reciprocal member being movable to said first position by said injected plastic, said plastic then passing through said first path of travel, through said outlet, through said interconnecting means, and into said mold means, and means, operative following passage of said plastic into said mold means for clearing plastic material from said interconnecting means and from said outlet for moving said material therethrough, said clearing means moving said reciprocal member to said second position, said plastic material then passing through said second path of travel and being remelted during movement through said second path of travel.

2. An apparatus of claim 1 wherein said heated member comprises a nozzle, said reciprocal member is substantially hollow, and said shuttle member in said first position forms a seal with said nozzle whereby said melted plastic passes only through said first path of travel.

3. The apparatus of claim 1 wherein said reciprocal member includes a discharge opening which permits passage of said melted plastic therethrough and prevents passage of said plastic material in a reverse direction, therethrough.

4. The apparatus of claim 1 wherein said reciprocal member includes a substantially hollow portion having a discharge opening aligned with said outlet and with said interconnecting means, said first path of travel being defined in said hollow portion, and in said discharge opening.

5. The apparatus of claim 4 wherein a chamber is defined between said hollow member and said heated member and apertures are provided in said reciprocal member for interconnecting the hollow portion of said reciprocal member with said channel means, said second path of travel being defined by said chamber, said apertures, and said hollow portion of said reciprocal member.

6. The apparatus of claim 1 wherein said reciprocal member, in said second position, defines said second path of travel adjacent said heated member whereby said plastic material is reheated and remelted for reuse in the next cycle of operation of said injection molding machine.

7. The apparatus of claim 1 wherein said interconnecting means is substantially straight, said clearing means comprises a reciprocal pin which is movable from a position downstream of said mold means during injection of said plastic into said mold means and to a position through said outlet of said heated member during the clearing of said plastic material from said interconnecting means.

8. In a plastic injection molding machine, a heated nozzle having an outlet for melted plastic, mold means, a sprue line interconnecting said outlet and said mold means, a shuttle member reciprocally carried within said nozzle, said shuttle member being movable between an injection position and a retraction position, an annular chamber being defined between said nozzle and said shuttle member, said shuttle member having a discharge opening, a hollow interior portion, and apertures for communicating said chamber with said interior portion, means for injecting pressurized melted plastic into said nozzle through said interior portion, through said discharge opening, through said nozzle outlet, through said sprue line and into said mold means, said pressurized plastic moving said shuttle member to said injection position, and movable means for substantially clearing solidified sprue material from said sprue line after injection of said plastic into said mold means, said clearing means moving said sprue material through the sprue line and into said chamber for heating and remelting thereof in said heated nozzle, said sprue material thereafter passing through said apertures and into said interior portion, said clearing means also moving said shuttle member to the retraction position, said remelted sprue being useful for introduction into said mold means.

9. The apparatus of claim 8 wherein in the said injection position, a seal is defined between said shuttle member and said nozzle member whereby said plastic moves through said hollow portion, through said discharge opening and through said outlet.

10. The apparatus of claim 9 wherein said sprue line is substantially straight and said clearing means comprises a reciprocal pin which is movable from a position downstream of said mold means during injection of said plastic into said mold means, and to a position through said outlet and partially into said nozzle member during removal of said sprue material from said sprue line.

* * * * *